E. F. W. ALEXANDERSON.
ALTERNATING CURRENT MOTOR.
APPLICATION FILED APR. 17, 1908.
927,398.
Patented July 6, 1909.
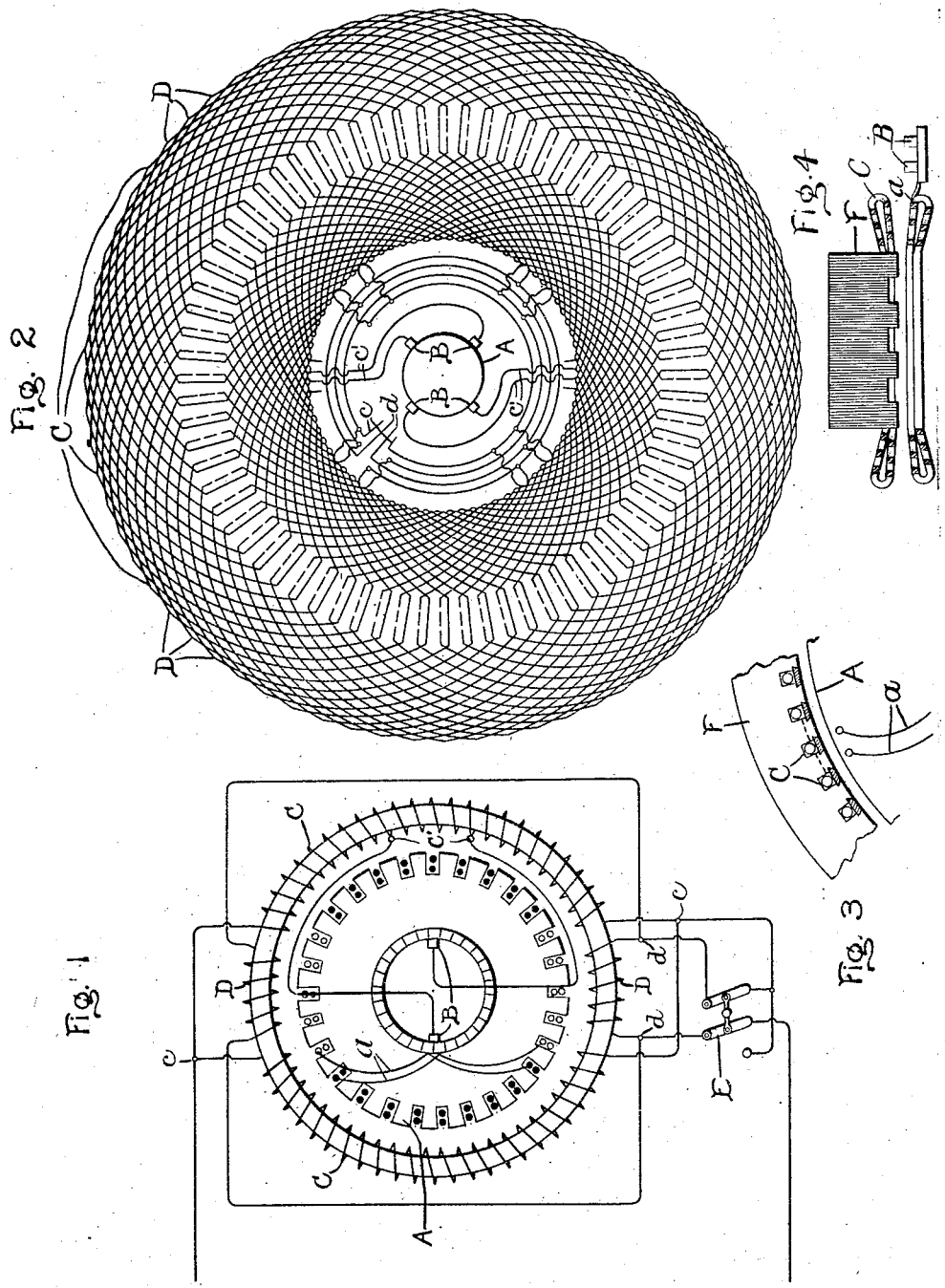
WITNESSES:
INVENTOR
ERNST F. W. ALEXANDERSON.
BY
ATT'Y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 927,398.  Specification of Letters Patent.  Patented July 6, 1909.

Application filed April 17, 1908. Serial No. 427,686.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating-current motors of the commutator type, and particularly to what is known as repulsion motors, in which the armature is connected in a local closed circuit. Such motors are particularly advantageous for use on high-voltage circuits, since the inducing winding on the stator may readily be designed for high voltages, while the voltage in the armature circuit is low.

Repulsion motors of the simplest form, in which the armature is directly short-circuited, do not commutate satisfactorily at speeds much above synchronism. I have disclosed in a prior application Serial No. 383,807, filed July 15, 1907, a repulsion motor in which the armature is connected in a local closed circuit, but in which commutation at high speeds is obtained by including in the armature circuit a source of shunt voltage, and also the exciting winding of the motor. The shunt voltage in the armature circuit reduces the strength of the inducing field, and therefore prevents the production of excessive currents in the short-circuited coils, due to cutting this field at high speeds, while the exciting winding in the local closed circuit acts as a reactance, producing leakage fields which, when cut by the short-circuited coils, neutralize the effect of commutation reactance. I have further pointed out in that prior application that, in order to obtain the full advantages of the motor connections, the pitch of the armature coils should correspond to the portion of the stator covered by the inducing winding, so that the magnetomotive forces of inducing and armature windings may have the same distribution, so that commutation may take place in a proper commutating field.

It is not always convenient to provide a separate transformer for supplying the shunt voltage for the armature circuit, nor is it always convenient to include the exciting winding in the armature circuit.

My present invention consists in a novel arrangement of the motor connections, whereby the same results with respect to commutation are obtained as by the arrangement disclosed in my former application, but no separate transformer is required, neither is it necessary to include the exciting winding in the armature circuit.

My invention consists in short-circuiting the armature along the line of magnetization of the inducing winding through a central portion of the inducing winding included in said circuit. By including a portion only of the inducing winding in the armature circuit, a voltage is impressed on the brushes substantially in phase with the line-voltage, but of a smaller amount, such as would be obtained from a separate shunt transformer, while by employing the central portion of the inducing winding for supplying this voltage, leakage fields are produced, due to the imperfect interlinkage of the fluxes in the central and end-portions of the inducing winding, which leakage fields in the end portions assist in commutation by neutralizing the electromotive force of commutation reactance precisely as did the leakage fields produced by including the exciting winding in the armature-circuit, as disclosed in my earlier application. As in the arrangements of my earlier application, the coil-pitch of the armature winding should correspond to the portions of the stator covered by the inducing winding.

My invention will best be understood by reference to the accompanying drawing, in which—

Figure 1 shows diagrammatically an alternating-current motor arranged in accordance with my invention; Fig. 2 shows diagrammatically the development of a complete stator winding and connections for a four-pole motor; and Figs. 3 and 4 show detail views of the stator laminations at the point of commutation.

In the drawings A represents the armature, which is provided with a commutator and commutator-brushes B.

C represents the inducing winding on the stator, and D the exciting winding. The terminals of the inducing winding are indicated at $c$ $c$, and the terminals of the exciting winding at $d$ $d$.

E represents a reversing switch whereby the relative connections of inducing and exciting windings, and consequently the direction of rotation of the motor, may be reversed.

In addition to the terminals $c$ $c$, taps $c'$ are led off from the inducing winding C at points near its center, and by means of these taps the armature is connected in a local closed circuit through central portions of the inducing winding. A voltage substantially in phase with the line voltage, but of small amount, is thereby impressed upon the armature-brushes, while the imperfect interlinkage of the fluxes of the central portion of the inducing winding between the taps $c'$ and of the end portions of the winding result in leakage fields which assist commutation as has heretofore been explained. The brushes are shown connected to the inducing winding on one pole only, for if the points $c'$, $c'$, were connected to similar points on the other half of the winding cross-currents would flow through the connections. In order to obtain the full benefit of the connections shown, the armature coil-pitch should correspond to the portions of the stator over which the inducing winding is distributed. This is indicated in Fig. 1, in which two armature-coils $a$ are shown. The end connections of the other coils are omitted in order to avoid confusing the diagram, but the conductors are shown in the slots, and the effective conductors are distinguished from the conductors which are ineffective, due to the fractional pitch, by representing them by full circles, and the ineffective conductors by light circles. By means of the connections shown in Fig. 1, the same results with respect to commutation are obtained as though a separate transformer were employed for impressing a shunt-voltage on the armature-brushes, and the exciting winding were included in the armature-circuit.

Fig. 2 shows a diagrammatic development of the stator winding for a four-pole machine. Three coils per pole of the stator are employed for the exciting winding, as indicated at D in Fig. 2. The remaining stator coils form the inducing winding C. The terminals $c$ of the inducing winding and the terminals $d$ of the exciting winding, and the taps $c'$ on the central portions of the inducing winding are lettered as in Fig. 1. It will be noted that in Fig. 2 I have shown four taps brought out from the central portion of the inducing winding, so that the number of coils of the inducing winding connected in the armature-circuit, and consequently the amount of shunt-voltage impressed on the armature, may be varied.

In Figs. 1 and 2 I have not illustrated in the drawings the mechanical construction of stator or rotor, since these are matters which will be obvious to those skilled in the art. Since the stator windings, both inducing and exciting, are distributed, the stator would be formed in practice like the stator of a standard induction motor,—that is, with a laminated and uniformly distributed and slotted core, while the armature would be constructed like that of an ordinary direct-current motor. It is sometimes desirable, for speeds much above synchronous, to reduce the amount of stator flux at the point of commutation. This can be done conveniently by cutting off the ends of the teeth of a portion of the stator laminations F opposite the armature coils $a$ undergoing commutation, as shown by the dotted lines in Fig. 3 and more clearly in Fig. 4. This in effect increases the air gap at the point of commutation, while the teeth of the uncut laminations serve to hold the retaining wedges for the stator coils C.

I do not desire to limit myself to the particular winding arrangements and connections shown, but aim in the appended claims to cover all modifications which are within the scope of my invention.

What I claim as new and desire to secure by Letters Patent of the United States, is,—

1. An alternating-current motor having inducing and exciting windings on the stator, an armature provided with a commutator, and brushes and connections short-circuiting the armature on the line of magnetization of the inducing winding through the central portion of the inducing winding.

2. An alternating-current motor having inducing and exciting windings on the stator, an armature provided with a commutator and brushes, and having a winding with coil-pitch corresponding to the portions of the stator covered by the inducing windings, and connections including the armature in a local closed circuit with the central portion of the inducing winding.

3. An alternating-current motor having inducing and exciting windings on the stator, the inducing winding being distributed over a portion only of the stator, an armature provided with a commutator and brushes and having a winding with fractional-pitch corresponding to the portion of the stator over which the inducing winding is distributed, and connections including the armature in a local closed circuit with the central portion of the inducing winding.

4. An alternating-current motor having inducing and exciting windings on the stator, an armature provided with a commutator and brushes, and connections including the armature in a local closed circuit with the central portion of the inducing winding, said central portion being provided with more than two taps, whereby the number of coils of the inducing winding included in said local circuit may be varied.

5. An alternating-current motor having inducing and exciting windings on the stator, the inducing winding being distributed over a portion only of the stator, an armature provided with a commutator and brushes and having a winding with fractional-pitch corresponding to the portion of the stator over which the inducing winding is distributed, and connections including the armature in a local closed circuit with the central portion of the inducing winding, said central portion being provided with more than two taps, whereby the number of coils of the inducing winding included in said local circuit may be varied.

In witness whereof, I have hereunto set my hand this 16 day of April, 1908.

ERNST F. W. ALEXANDERSON.

Witnesses:
BENJAMIN B. HULL,
HELEN ORFORD.